US008900445B2

(12) United States Patent
Xie et al.

(10) Patent No.: US 8,900,445 B2
(45) Date of Patent: Dec. 2, 2014

(54) PROCESS FOR THE CATALYTIC CONVERSION OF HYDROCARBONS

(75) Inventors: Chaogang Xie, Beijing (CN); Genquan Zhu, Beijing (CN); Yihua Yang, Beijing (CN); Yibin Luo, Beijing (CN); Jun Long, Beijing (CN); Xingtian Shu, Beijing (CN); Jiushun Zhang, Beijing (CN)

(73) Assignees: China Petroleum & Chemical Corporation, Beijing (CN); Research Institute of Petroleum Processing, Sinopec, Beijing (CN)

( * ) Notice: Subject to any disclaimer, the term of this patent is extended or adjusted under 35 U.S.C. 154(b) by 173 days.

(21) Appl. No.: 12/439,309

(22) PCT Filed: Sep. 28, 2006

(86) PCT No.: PCT/CN2006/002560
§ 371 (c)(1),
(2), (4) Date: Apr. 15, 2009

(87) PCT Pub. No.: WO2008/028343
PCT Pub. Date: Mar. 13, 2008

(65) Prior Publication Data
US 2009/0264693 A1    Oct. 22, 2009

(30) Foreign Application Priority Data

Aug. 31, 2006   (CN) .......................... 2006 1 0112733

(51) Int. Cl.
| | | |
|---|---|---|
| *C10G 11/02* | (2006.01) | |
| *B01J 29/80* | (2006.01) | |
| *B01J 29/76* | (2006.01) | |
| *B01J 29/78* | (2006.01) | |
| *C10G 11/05* | (2006.01) | |
| *C10G 11/14* | (2006.01) | |
| *C10G 11/16* | (2006.01) | |
| *C10G 11/18* | (2006.01) | |
| *B01J 29/40* | (2006.01) | |
| *B01J 29/60* | (2006.01) | |
| *B01J 29/70* | (2006.01) | |
| *B01J 37/00* | (2006.01) | |

(52) U.S. Cl.
CPC .............. *B01J 29/80* (2013.01); *B01J 29/7615* (2013.01); *B01J 29/7815* (2013.01); *C10G 11/02* (2013.01); *C10G 11/05* (2013.01); *C10G 11/14* (2013.01); *C10G 11/16* (2013.01); *C10G 11/18* (2013.01); *B10J 29/084* (2013.01); *B10J 29/18* (2013.01); *B01J 29/40* (2013.01); *B01J 29/60* (2013.01); *B01J 29/7057* (2013.01); *B01J 37/0045* (2013.01); *B01J 2229/18* (2013.01); *B01J 2229/42* (2013.01); *C10G 2300/4018* (2013.01); *C10G 2300/1033* (2013.01); *C10G 2300/104* (2013.01); *C10G 2300/1044* (2013.01); *C10G 2300/1055* (2013.01); *C10G 2300/107* (2013.01); *C10G 2300/1074* (2013.01); *C10G 2300/1077* (2013.01); *C10G 2300/4093* (2013.01); *C10G 2400/02* (2013.01); *C10G 2400/04* (2013.01); *C10G 2400/20* (2013.01); *C10G 2300/807* (2013.01)
USPC ...... 208/120.15; 208/113; 208/114; 208/118; 208/119

(58) Field of Classification Search
USPC ......... 208/106, 113, 121, 122, 124, 114, 118, 208/119, 120.15; 585/650, 653
See application file for complete search history.

(56) References Cited

U.S. PATENT DOCUMENTS

| | | | | |
|---|---|---|---|---|
| 3,308,069 | A | * | 3/1967 | Rosinski et al. ................ 502/62 |
| 3,541,179 | A | | 11/1970 | Okagami et al. |
| 3,647,682 | A | | 3/1972 | Rabo et al. |
| 3,725,495 | A | | 4/1973 | Wrisberg et al. |
| 3,758,403 | A | | 9/1973 | Rosinski et al. |
| 3,839,485 | A | | 10/1974 | Wrisberg et al. |
| 3,972,832 | A | * | 8/1976 | Butter et al. ..................... 502/77 |
| 4,973,399 | A | * | 11/1990 | Green et al. ............... 208/120.1 |
| 4,976,847 | A | | 12/1990 | Maxwell et al. |
| 5,006,497 | A | | 4/1991 | Herbst et al. |
| 5,055,176 | A | | 10/1991 | Herbst et al. |
| 5,194,412 | A | | 3/1993 | Roberie et al. |
| 5,232,579 | A | | 8/1993 | Absil et al. |
| 5,232,675 | A | | 8/1993 | Shu et al. |
| 5,236,880 | A | | 8/1993 | Chapman |
| 5,258,570 | A | * | 11/1993 | Skeels et al. .................. 585/739 |
| 5,380,690 | A | | 1/1995 | Zhicheng et al. |
| 5,457,078 | A | * | 10/1995 | Absil et al. ...................... 502/68 |
| 5,670,037 | A | | 9/1997 | Zaiting et al. |

(Continued)

FOREIGN PATENT DOCUMENTS

| | | | |
|---|---|---|---|
| CA | 2 067 630 | A1 | 12/1992 |
| CA | 2 332 299 | A1 | 11/1999 |

(Continued)

OTHER PUBLICATIONS

IZA-SC Database, Database of Zeolite Structures available on-line at http://izasc.ethz.ch.*

(Continued)

*Primary Examiner* — Prem C Singh
*Assistant Examiner* — Bradley Etherton
(74) *Attorney, Agent, or Firm* — Scully, Scott, Murphy & Presser, P.C.

(57) ABSTRACT

A process for the catalytic conversion of hydrocarbons to convert petroleum hydrocarbons in a higher yield for light olefins, particularly propylene is disclosed, the process involving a hydrocarbon-converting catalyst comprising zeolite, phosphorous and a transition metal, as defined herein.

17 Claims, No Drawings

(56) References Cited

U.S. PATENT DOCUMENTS

| | | | |
|---|---|---|---|
| 5,905,051 A | 5/1999 | Wu et al. | |
| 5,951,963 A * | 9/1999 | He et al. | 423/713 |
| 6,080,698 A | 6/2000 | Zhang et al. | |
| 6,210,562 B1 | 4/2001 | Xie et al. | |
| 6,211,104 B1 | 4/2001 | Shi et al. | |
| 6,342,153 B1 | 1/2002 | Guan et al. | |
| 6,503,862 B1 | 1/2003 | Yamamoto | |
| 6,538,169 B1 | 3/2003 | Pittman et al. | |
| 6,566,293 B1 | 5/2003 | Vogt et al. | |
| 6,791,002 B1 | 9/2004 | Abrevaya et al. | |
| 7,767,611 B2 | 8/2010 | Luo et al. | |
| 2004/0266608 A1 | 12/2004 | Long et al. | |
| 2005/0070422 A1 | 3/2005 | Chen et al. | |
| 2005/0133419 A1 * | 6/2005 | Long et al. | 208/120.01 |
| 2005/0227853 A1 * | 10/2005 | Kumar | 502/64 |
| 2006/0014630 A1 | 1/2006 | Matsumoto et al. | |
| 2007/0293714 A1 | 12/2007 | Long et al. | |

FOREIGN PATENT DOCUMENTS

| | | |
|---|---|---|
| CA | 2 345 491 A1 | 9/2002 |
| CN | 1043520 A | 12/1988 |
| CN | 1052290 A | 6/1991 |
| CN | 1057408 A | 1/1992 |
| CN | 1058382 A | 2/1992 |
| CN | 1354224 A | 6/1992 |
| CN | 1085825 A | 4/1994 |
| CN | 1026242 C | 10/1994 |
| CN | 1093101 A | 10/1994 |
| CN | 1099788 A | 3/1995 |
| CN | 1103105 A | 5/1995 |
| CN | 1114916 A | 1/1996 |
| CN | 1117518 A | 2/1996 |
| CN | 1143666 A | 2/1997 |
| CN | 1145396 A | 3/1997 |
| CN | 1147420 A | 4/1997 |
| CN | 1036320 C | 11/1997 |
| CN | 1194181 A | 9/1998 |
| CN | 1211469 A | 3/1999 |
| CN | 1211470 A | 3/1999 |
| CN | 1221015 A | 6/1999 |
| CN | 1222558 A | 7/1999 |
| CN | 1465527 A | 1/2004 |
| CN | 1504540 A | 6/2004 |
| CN | 1504541 A | 6/2004 |
| CN | 1566275 A | 1/2005 |
| CN | 1611299 A | 5/2005 |
| CN | 1205307 C | 6/2005 |
| DE | 225 135 A1 | 6/1980 |
| EP | 0 503 876 A1 | 9/1992 |
| JP | H 02-113090 | 4/1990 |
| JP | 04-354541 | 12/1992 |
| JP | H 05-64743 | 3/1993 |
| JP | 05-201722 | 8/1993 |
| JP | H 11-217341 | 8/1999 |
| JP | 2002-515329 | 5/2002 |
| JP | 2002-294254 | 10/2002 |
| JP | 2007-530266 | 11/2007 |
| SU | 550173 | 6/1975 |
| SU | 559946 | 6/1975 |
| SU | 1214726 | 2/1986 |
| WO | WO 95/02653 A1 | 1/1995 |

OTHER PUBLICATIONS

IZA-SC Home Page, accessed May 3, 2011.*
Office Action dated Oct. 6, 2009 for U.S. Appl. No. 11/915,765, now U.S. Patent No. 7,767,611.
Amendment in Response to Non-Final Office Action dated Jan. 6, 2010 for U.S. Appl. No. 11/915,765, now U.S. Patent No. 7.767,611.
Information Disclosure Statement dated Apr. 18, 2008 for U.S. Appl. No. 11/915,765, now U.S. Patent No. 7,767,611.
Office Action dated Mar. 31, 2011 for U.S. Appl. No. 12/439,315.
Amendment in Response to Non-Final Office Action dated Mar. 31, 2011 for U.S. Appl. No. 12/439,315.
Fan, Yu, et al., "Hβ/HZSM-5 composite carrier supported catalysts for olefins reduction of FCC gasoline via hydroisomerization and aromatization", Catalysis letters, vol. 104, No. 1-2, pp. 67-75, Nov. 2005.

* cited by examiner

PROCESS FOR THE CATALYTIC CONVERSION OF HYDROCARBONS

TECHNICAL FIELD

The present invention relates to a process of catalytic conversion of hydrocarbons, and particularly to a process for the catalytic conversion for higher selectively producing light olefins from hydrocarbons.

BACKGROUND ART

Ethylene and propylene are typical light olefins which are the most basic raw materials in the chemical engineering. In the domestic and foreign, the light olefins are mainly prepared from natural gas or light hydrocarbons by a steam splitting process in an ethylene combination unit. The second-largest source of light olefins is from a fluidized catalytic cracking (FCC) unit in a refinery. The conventional catalytic cracking process also produces light olefins as by-products with a yield of only less than 15% of feedstock during the production of gasoline and light diesels. Specific formulations of a catalytic cracking catalyst and/or adjuvant are usually selected in a refinery to improve the yield of propylene.

U.S. Pat. No. 5,670,037 discloses a process for producing light olefins, wherein the feedstock are petroleum fractions with different boiling ranges, residual oil or crude oil. A solid acidic catalyst is used in a fluidized bed or moving bed reactor to conduct the catalytic conversion reaction, at a temperature of 480° C. to 680° C. and a pressure of 0.12 to 0.40 MPa, with a reaction time of 0.1 to 6 seconds and a weight ratio of catalyst to oil of 4-12, and the spent catalyst is stripped, burnt and regenerated, then recycled to the reactor for reuse. Compared to the conventional catalytic cracking and the steam splitting process, the process can give more propylene and butylene, wherein the total yield of butylene and propylene can reach at about 40%.

U.S. Pat. No. 6,538,169 discloses a process for improving the yield of light olefins, which comprises, recycling a part of the spent catalysts back to the bottom of the reactor, raising the catalyst to oil ratio, decreasing the temperature at which the catalyst and the oil contact, and adding a ZSM-5 adjuvant to the reaction system.

U.S. Pat. No. 6,791,002B1 discloses a riser system for cracking of hydrocarbons, wherein the cracking reaction temperature and residence time of feedstock having different compositions are controlled to improve the yield of the light olefins. The process didn't mention to optimize the conversion of components by modifying the active components of the catalyst in order to improve the selectivity of the light olefins.

The catalytic cracking process for obtaining light olefins from petroleum hydrocarbons have been reported in many patents. The metal-supported catalysts are used, wherein the carrier are $SiO_2$, $Al_2O_3$, or other oxides, and the metal components are mainly selected from elements of Groups IIB, VB, VIIB, and VIII, which show a hydrogenation or dehydrogenation activity, exhibits a dehydrogenation activity in cracking conditions of high temperature and low pressure, and thus accelerates the production of light olefins (U.S. Pat. No. 3,541,179, U.S. Pat. No. 3,647,682, DD225135 and SU 1214726). When these catalysts are used, owing to the dehydrogenation property of the supported metals, the coke formation due to the polymerization reaction is accordingly accelerated during the cracking reaction, and increased coke is formed on the catalyst. Hence, only these light feedstocks with a boiling range less than 220° C. can be used.

A composite oxide catalyst is used in some other patents. By ways of example of these catalysts, mention will be made of a catalyst comprising $ZrO_2$, $HfO_2$ as main components, $Al_2O_3$, $Cr_2O_3$, MnO, $Fe_2O_3$ and oxides of alkaline metal or alkaline earth metal as an adjuvant (U.S. Pat. No. 3,725,495, U.S. Pat. No. 3,839,485); and $SiO_2.Al_2O_3$ catalyst containing small amounts of $Fe_2O_3$, $TiO_2$, CaO, MgO, $Na_2O$, and $K_2O$ (SU 550173, SU 559946).

With the widespread application of zeolite in the petrochemical and petroleum processing, there appears the third class of catalysts, i.e., the catalysts comprising zeolite. In recent years, a shape selective additive is added into a catalyst to enhance the octane number of catalytic gasoline. For example, U.S. Pat. No. 3,758,403 discloses a catalyst using ZSM-5 zeolite and a large pore zeolite (with a ratio of 1:10 to 3:1) as active components, and in addition to enhancing the octane number of the gasoline, this catalyst provides a higher yield of $C_3$ and $C_4$ olefins, with a $C_3$ and $C_4$ olefins yield of roughly 10% by weight.

When the catalyst contains a mixture of a zeolite with the MFI structure (silicon-rich five-member-ring zeolite) and a zeolite with a pore size greater than 7 angstrom is used in the cracking of petroleum hydrocarbons to produce light olefins, the large pore zeolite (Y type zeolite mainly) is used to crack the feedstock to produce gasoline and diesel, which are further cracked into light olefins by the zeolite with the MFI structure (U.S. Pat. No. 3,758,403, CN 1043520A, U.S. Pat. No. 500,649, and CN 1026242C). To increase the olefin selectivity of catalysts, the MFI zeolite is further modified with, for examples, transition metals (U.S. Pat. No. 5,236,880), phosphorus (CN 1205307A, U.S. Pat. No. 6,566,293), rare earth (CN 1085825A), phosphorus and rare earth (CN 1093101A, U.S. Pat. No. 5,380,690, CN 1114916A, CN 1117518A, CN 1143666A), phosphorus and alkaline earth metals (CN 1221015A, U.S. Pat. No. 6,342,153, CN 1222558A, U.S. Pat. No. 6,211,104), and phosphorus and transition metals (CN 1504540A).

The zeolite beta has a 12 member-ring structure with intersected porous channels, wherein the pore diameter of the 12-member ring is 0.75-0.57 nm for the one-dimension porous channel parallel to the (001) crystal face, while the pore diameter of the 12 member-ring is 0.65-0.56 nm for the two-dimension porous channel parallel to the (100) crystal face. The zeolite beta is a silicon-rich large pore zeolite having a three-dimension structure that is the only one discovered up to now, and has both acid catalytic property and structural selectivity due to its structural particularity, and further has very high thermostability (the failure temperature of the crystal lattice is higher than 1200° C.), hydrothermal stability and abrasion-resistant property. Due to the unique structural feature, the zeolite beta has good thermal and hydrothermal stability, acid resistance, anti-coking property and catalytic activity in a series of catalytic reactions; therefore it has been developed rapidly into a new-type of catalytic materials in recent years. Many uses of the zeolite beta in the cracking of petroleum hydrocarbons to produce light olefins are reported.

CN 1103105A discloses a cracking catalyst being capable of giving a higher yield of isobutylene and isoamylene, and said catalyst is a composite consisting of four active components and a carrier, wherein the active components consist of a modified HZSM-5 and silicon-rich HZSM-5 with different silica/alumina ratios, USY and zeolite beta, the carrier consists of a natural clay and an inorganic oxide, and the components and contents of the catalyst are as follows: (1) the modified HZSM-5 with a silica/alumina ratio of 20 to 100: 5-25% by weight; (2) the silicon-rich HZSM-5 with a silica/alumina ratio of 250 to 450:1-5% by weight; (3) the USY zeolite: 5-20% by weight; (4) the zeolite beta: 1-5% by weight; (5) the natural clay: 30-60% by weight; (6) the inorganic oxide: 15-30% by weight. The catalyst has the feature of being capable to give a higher yield of isobutylene and isoamylene, while can co-produce a gasoline with a high octane number.

CN 1057408A discloses a cracking catalyst containing a silicon-rich zeolite, wherein said catalyst consists of 10-30 wt % of modified silicon-rich zeolite and 70-90 wt % of carrier, said modified silicon-rich zeolite comprises, based on the weight of the zeolite, 0.01-3.0 wt % phosphorus, 0.01-1.0 wt % of iron or 0.01-10 wt % of aluminum (the aluminum in the structure of the zeolite is excluded), and is selected from mordenite, zeolite beta, or ZSM zeolite with a silica/alumina ratio higher than 15, and said carrier is an inorganic oxide or a mixture of an inorganic oxide and kaolin. The catalyst is used to produce light olefins during the catalytic cracking process of hydrocarbons, and co-produce gasoline and diesel.

CN 1099788A discloses a cracking catalyst being capable of giving a higher yield of $C_3$-$C_5$ olefins, wherein said catalyst consists of 10-50 wt % of Y type zeolite with a unit cell size of 2.450 nm or less, 2-40 wt % of a zeolite selected from ZSM-5 zeolite or zeolite beta modified with P, RE, Ca, Mg, H, Al, etc. and mixture thereof, 20-80 wt % of semi-synthetic carrier consisting of kaolin and alumina binder. Said catalyst can enhance the yield of $C_3$-$C_5$ olefins wherein yield of $iC_4^=$+ $iC_5^=$ is Up to 10-13 wt %, simultaneously keeping the yield of gasoline at about 35-42 wt %.

CN 1145396A discloses a cracking catalyst being capable of giving a higher yield of isobutylene and isoamylene, and said catalyst consists of three active zeolite components and a carrier, based on the weight of the catalyst: 6-30 wt % of silicon-rich five-member-ring zeolite containing phosphorus and rare earth, 5-25 wt % of USY zeolite, 1-5 wt % of zeolite beta, 30-60 wt % of clay, and 15-30 wt % of inorganic oxide. The catalyst has the feature of being capable to give a higher yield of isobutylene and isoamylene, while can co-produce a gasoline with a high octane number.

CN 1354224A discloses a catalytic cracking catalyst for producing a gasoline rich in isomeric alkane, propylene and isobutane, wherein said catalyst consists of, based on the weight of the catalyst, 0-70 wt % of clay, 5-90 wt % of inorganic oxide and 1-50 wt % of a zeolite. The zeolite is a mixture of, based on the weight of the zeolite, (1) 20-75 wt % of silicon-rich Y-type zeolite with a silica/alumina ratio of 5-15 and $RE_2O_3$ content of 8-20 wt %, (2) 20-75 wt % of silicon-rich Y-type zeolite with a silica/alumina ratio of 16-50 and $RE_2O_3$ content of 2-7 wt %, and (3) 1-50 wt % of zeolite beta or mordenite or ZRP zeolite. The catalyst can increase the content of the isomeric alkane in the gasoline and simultaneously increase the yield of propylene and isobutane, but the yield of propylene is just slightly enhanced.

CN 1504541A discloses a catalyst for catalyzing the cracking of hydrocarbons to produce light olefins and co-produce aromatics, comprising a molecular sieve with a pore size of 0.45-0.7 nm, an amorphous oxide and at least two modifying components selected from phosphorus, alkaline earth metals, lithium, and rare earth. Said molecular sieve is a silica-alumina or silica-phosphor-alumina molecular sieve, wherein said silica-alumina molecular sieve is ZSM-5, ZSM-11, mordenite, or zeolite beta, and said silica-phosphor-alumina molecular sieve is SAPO-5, SAPO-11 or SAPO-34. The active center of the catalyst can be modulated according to the practical needs of products, to prepare the light olefins as main products or co-produce the aromatics during the production of olefins.

CN 1566275A discloses a molecular sieve-containing catalyst for cracking hydrocarbons and preparation thereof, said catalyst contains a molecular sieve which is a mixture of a first zeolite and a second zeolite, a thermotolerant inorganic oxide and a metal component with or without clay, the first zeolite is a Y-type one, the second zeolite is one with a molar ratio of silica to alumina of more than 20, the content of the first zeolite is 1-50 wt %, the content of the second zeolite is 1-60 wt %, the content of the thermotolerant inorganic oxide is 2-80 wt %, the content of the clay is 0-80 wt %, the content of the metal component is 0.1-30 wt %, and said metal components substantially exists as a reduction valence state. The catalyst can not only give a high yield of $C_3$-$C_5$ olefins, but also have a higher activity of desulfurization, and further have a higher cracking activity. Said second zeolite is one or more selected from zeolite with MFI structure containing phosphorus, rare earth and/or alkaline earth metal or not, zeolite beta containing phosphorus, rare earth and/or alkaline earth metal or not, mordenite containing phosphorus, rare earth and/or alkaline earth metal or not.

U.S. Pat. No. 5,006,497 and U.S. Pat. No. 5,055,176 disclose a multi-component catalyst and the catalytic cracking process thereof. Said catalyst comprises a matrix, a large pore molecular sieve, a paraffin cracking/isomerization molecular sieve and an aromatization molecular sieve, wherein said large pore molecular sieve is selected from the group consisting of zeolite Y, DeAlY, USY, UHPY, VPI-5, columnar clay, SAPO-37, zeolite beta and mixtures thereof; said paraffin cracking/isomerization molecular sieve is selected from the group consisting of hydrogen-type ZSM-5, ZSM-11, ZSM-22, ZSM-35 and ZSM-57; and said aromatization molecular sieve is GaZSM-5.

US 20050070422 discloses a catalyst composition used for increasing the yield of propylene by catalytic cracking, wherein said catalyst comprises a first molecular sieve having an intermediate pore size, a second molecular sieve having at least one pore size of the channel which is less than that of the first molecular sieve, and optionally a third large pore molecular sieve, wherein said first molecular sieve is selected from the group consisting of ZSM-5, ZSM-11, ZSM-12, ZSM-57, ITQ-13 and MCM-22; the second molecular sieve is selected from the group consisting of ECR-42, ZSM-22, ZSM-35, ZSM-23, MCM-22, MCM-49, SAPO-11, SAPO-34 and SAPO-41; and the third molecular sieve is selected from the group consisting of faujasite, zeolite L, VPI-5, SAPO-37, zeolite X, zeolite beta, ZSM-3, ZSM-4, ZSM-18, ZSM-20, MCM-9, MCM-41, MCM-41S, MCM-48, Y-type zeolite, USY, REY, REUSY and so on. Said catalyst is suitably used for the production of propylene by cracking naphtha and heavy hydrocarbon feedstocks.

With further increasing demand on light olefins, a process for the catalytic conversion of hydrocarbons is desired to be developed, wherein said process exhibits a higher ability to convert petroleum hydrocarbon and higher yield for light olefins, especially propylene.

SUMMARY OF THE INVENTION

The present invention is put forward in view of the aforesaid development status of the prior art, aiming to provide a catalytic cracking process for higher selectively producing light olefins from hydrocarbons.

After intensive studies, the inventor finds that, when a hydrocarbon conversion catalyst comprises a specific modified zeolite beta as the catalyst component, the selectivity of $C_2$-$C_{12}$ olefins may be notably improved, thus to be advantageous to the production of light olefins ($C_2$-$C_4$ olefins) by a further cracking. Thereby, said light olefins can be produced from petroleum hydrocarbon in a higher yield with the hydrocarbon conversion catalyst which is prepared from said modified zeolite beta as an active component, and thereby the present invention is accomplished.

In order to achieve said purpose, the present invention provides a process for the catalytic conversion of hydrocarbons, said process comprising the following steps:

a feedstock of hydrocarbons is contacted with a hydrocarbon-converting catalyst to conduct a catalytic cracking reaction in a reactor in which the catalyst is movable, then the reaction product and the spent catalyst are taken from said reactor for separation by stripping, the separated spent catalyst is returned into the reactor for recycle after regenerated by air burning, and the separated reaction product is fractionated to give light olefins, gasoline, diesel, heavy oil and other saturated hydrocarbons with low molecular weight, wherein said hydrocarbon-converting catalyst comprises, based on the total weight of the catalyst, 1-60 wt % of a zeolite mixture, 5-99 wt % of a thermotolerant inorganic oxide and 0-70 wt % of clay, wherein said zeolite mixture comprises, based on the total weight of said zeolite mixture, 1-75 wt % of a zeolite beta modified with phosphorus and a transition metal M, 25-99 wt % of a zeolite having a MFI structure and 0-74 wt % of a large pore zeolite, wherein the anhydrous chemical formula of the zeolite beta modified with phosphorus and the transition metal M is represented in the mass percent of the oxides as $(0-0.3)Na_2O \cdot (0.5-10)Al_2O_3 \cdot (1.3-10)P_2O_5 \cdot (0.7-15)M_xO_y \cdot (64-97)SiO_2$, in which the transition metal M is one or more selected from the group consisting of Fe, Co, Ni, Cu, Mn, Zn and Sn; x represents the atom number of the transition metal M, and y represents a number needed for satisfying the oxidation state of the transition metal M.

Specifically, the present invention relates to:

1. A process for catalytic conversion of hydrocarbons, said process comprising the following steps:

a feedstock of hydrocarbons is contacted with a hydrocarbon-converting catalyst to conduct a catalytic cracking reaction in a reactor in which the catalyst is movable, then the reaction product and the spent catalyst are taken from said reactor for separation by stripping, the separated spent catalyst is returned into the reactor for recycle after regenerated by air burning, and the separated reaction product is fractionated to give light olefins, gasoline, diesel, heavy oil and other saturated hydrocarbons with low molecular weight, wherein said hydrocarbon-converting catalyst comprises, based on the total weight of the catalyst, 1-60 wt % of a zeolite mixture, 5-99 wt % of a thermotolerant inorganic oxide and 0-70 wt % of clay, wherein said zeolite mixture comprises, based on the total weight of said zeolite mixture, 1-75 wt % of a zeolite beta modified with phosphorus and a transition metal M, 25-99 wt % of a zeolite having a MFI structure and 0-74 wt % of a large pore zeolite, wherein the anhydrous chemical formula of the zeolite beta modified with phosphorus and the transition metal M is represented in the mass percent of the oxides as $(0-0.3)Na_2O \cdot (0.5-10)Al_2O_3 \cdot (1.3-10)P_2O_5 \cdot (0.7-15)M_xO_y \cdot (64-97)SiO_2$, in which the transition metal M is one or more selected from the group consisting of Fe, Co, Ni, Cu, Mn, Zn and Sn; x represents the atom number of the transition metal M, and y represents a number needed for satisfying the oxidation state of the transition metal M.

2. The process according to Aspect 1, characterized in that the hydrocarbon-converting catalyst comprises, based on the total weight of the catalyst, 10-50 wt % of the zeolite mixture, 10-70 wt % of the thermotolerant inorganic oxide and 0-60 wt % of the clay.

3. The process according to Aspect 1, characterized in that the anhydrous chemical formula of the zeolite beta modified with phosphorus and the transition metal M is represented as $(0-0.2)Na_2O \cdot (1-9)Al_2O_3 \cdot (1.5-7)P_2O_5 \cdot (0.9-10)M_xO_y \cdot (75-95)SiO_2$.

4. The process according to Aspect 3, characterized in that the anhydrous chemical formula of the zeolite beta modified with phosphorus and the transition metal M is represented as: $(0-0.2)Na_2O \cdot (1-9)Al_2O_3 \cdot (2-5)P_2O_5 \cdot (1-3)M_xO_y \cdot (82-95)SiO_2$.

5. The process according to Aspect 1, characterized in that said transition metal M is one or more selected from the group consisting of Fe, Co, Ni and Cu.

6. The process according to Aspect 5, characterized in that said transition metal M is selected from the group consisting of Fe and/or Cu.

7. The process according to Aspect 1, characterized in that the zeolite having a MFI structure is one or more selected from the group consisting of ZSM-5 zeolites and ZRP zeolites.

8. The process according to Aspect 7, characterized in that the zeolite having a MFI structure is one or more selected from the group consisting of ZRP zeolites containing rare earth, ZRP zeolites containing phosphorus, ZRP zeolites containing phosphorus and rare earth, ZRP zeolites containing phosphorus and alkaline-earth metal and ZRP zeolites containing phosphorus and a transition metal.

9. The process according to Aspect 1, characterized in that the large pore zeolite is one or more selected from the group consisting of faujasite, zeolite L, zeolite beta, zeolite Ω, mordenite and ZSM-18 zeolite.

10. The process according to Aspect 9, characterized in that the large pore zeolite is one or more selected from the group consisting of Y-type zeolite, Y-type zeolite containing phosphorus and/or rare earth, ultra stable Y-type zeolite, and ultra stable Y-type zeolite containing phosphorus and/or rare earth.

11. The process according to Aspect 1, characterized in that the clay is one or more selected from the group consisting of kaolin, halloysite, montmorillonite, diatomite, endellite, saponite, rectorite, sepiolite, attapulgite, hydrotalcite and bentonite.

12. The process according to Aspect 1, characterized in that the clay is one or more selected from the group consisting of kaolin, halloysite and montmorillonite.

13. The process according to Aspect 1, characterized in that the reactor is one or more selected from the group consisting of a fluidized bed reactor, a riser, a downward conveying line reactor, and a moving bed reactor, or any combination thereof.

14. The process according to Aspect 13, characterized in that the riser is one or more selected from the group consisting of a riser with equal diameter, a riser with equal linear velocity and a riser with graduated diameter.

15. The process according to Aspect 13, characterized in that the fluidized bed reactor is one or more selected from the group consisting of a fixed fluidized bed reactor, a particulate fluidized bed reactor, a bubbling bed reactor, a turbulent bed reactor, a fast bed reactor, a conveying bed reactor and a dense phase fluidized bed reactor.

16. The process according to Aspect 1, characterized in that the operation conditions during the catalytic cracking reaction in the reactor are as follows: the reaction temperature being 480-650° C., the absolute pressure in the reaction zone being 0.15-0.30 MPa, and the weight hourly space velocity of the hydrocarbon feedstocks being 0.2-40 h$^{-1}$.

17. The process according to Aspect 1, characterized in that the hydrocarbon feedstock is one or more selected from the group consisting of C$_4$ hydrocarbons, gasoline, diesel, hydrogenation residue, vacuum gas oil, crude oil, and residue oil, or a mixture thereof.

18. The process according to Aspect 1, characterized in that a diluent is added into the reactor during the catalytic cracking reaction to reduce the partial pressure of the hydrocarbon feedstock, wherein the diluent is one or more selected from the group consisting of water vapor, light alkanes, and nitrogen gas, or a mixture thereof.

19. The process according to Aspect 18, characterized in that the diluent is water vapor, and the weight ratio of water vapor to the hydrocarbon feedstock is 0.01-2:1.

According to the hydrocarbon catalytic conversion process of the present invention, the hydrocarbon-converting catalyst which has the specific modified zeolite beta and the zeolite having a MFI structure as essential active components is used, thus exhibiting a higher ability to convert petroleum hydrocarbons and higher yields for light olefins (a higher light olefins selectivity), particularly for propylene. As shown in Example 33, under the conditions of a reaction temperature of 600° C., a ratio of catalyst to oil of 10, a weight hourly space velocity of 4 h$^{-1}$, the conversion of feedstock is 94.6%, the yield of C$_2$-C$_4$ olefins is 42.5% wherein the yield of propylene is 21.9%.

THE PREFERRED EMBODIMENTS OF THE INVENTION

In order to produce light olefins from hydrocarbons with a higher selectivity, the present invention provides a process for the catalytic conversion of hydrocarbons, said process comprising the following steps:

a feedstock of hydrocarbons is contacted with a hydrocarbon-converting catalyst to conduct a catalytic cracking reaction in a reactor in which the catalyst is movable, then the reaction product and the spent catalyst are taken from said reactor for separation by stripping, the separated spent catalyst is returned into the reactor for recycle after regenerated by air burning, and the separated reaction product is fractionated to give light olefins, gasoline, diesel, heavy oil and other saturated hydrocarbons with low molecular weight, wherein said hydrocarbon-converting catalyst comprises, based on the total weight of the catalyst, 1-60 wt % of a zeolite mixture, 5-99 wt % of a thermotolerant inorganic oxide and 0-70 wt % of clay, wherein said zeolite mixture comprises, based on the total weight of said zeolite mixture, 1-75 wt % of a zeolite beta modified with phosphorus and a transition metal M, 25-99 wt % of a zeolite having a MFI structure and 0-74 wt % of a large pore zeolite, wherein the anhydrous chemical formula of the zeolite beta modified with phosphorus and the transition metal M is represented in the mass percent of the oxides as (0-0.3)Na$_2$O.(0.5-10)Al$_2$O$_3$.(1.3-10)P$_2$O$_5$.(0.7-15)M$_x$O$_y$-(64-97)SiO$_2$, in which the transition metal M is one or more selected from the group consisting of Fe, Co, Ni, Cu, Mn, Zn and Sn; x represents the atom number of the transition metal M, and y represents a number needed for satisfying the oxidation state of the transition metal M.

In the context of the present invention, said term "light olefins" represents C$_2$-C$_4$ olefins, unless otherwise specified.

When the process for the catalytic conversion of hydrocarbons provided by the present invention is carried out, the reactor used may be, for example, selected from the group consisting of a fluidized bed reactor, a riser, a downward conveying line reactor, a moving bed reactor, a composite reactor consisting of a riser and a fluidized bed reactor, a composite reactor consisting of a riser and a downward conveying line reactor, a composite reactor consisting of two or more risers, a composite reactor consisting of two or more fluidized bed reactors, a composite reactor consisting of two or more downward conveying line reactors, and a composite reactor consisting of two or more moving bed reactors. Further, each of the above said reactors can be divided into two or more reaction zones as required.

The riser is one or more selected from the group consisting of a riser with equal diameter, a riser with equal linear velocity and a riser with graduated diameter. The fluidized bed reactor is one or more selected from the group consisting of a fixed fluidized bed reactor, a particulate fluidized bed reactor, a bubbling bed reactor, a turbulent bed reactor, a fast bed reactor, a conveying bed reactor and a dense phase fluidized bed reactor.

In the inventive process for the catalytic conversion of hydrocarbons, said hydrocarbon feedstock is one or more selected from the group consisting of a C$_4$ hydrocarbon, gasoline, diesel, hydrogenation residue, vacuum gas oil, crude oil, and residue, or a fraction mixture of these petroleum fractions, and also the crude oil and residue can be directly used.

In one preferred embodiment of the hydrocarbon catalytic conversion of the present invention, the hydrocarbon-converting catalyst comprises, based on the total weight of the catalyst, 10-50 wt % of said zeolite mixture, 10-70 wt % of said thermotolerant inorganic oxide and 0-60 wt % of said clay.

The hydrocarbon-converting catalyst of this invention and the method for producing the same are described in detail as follows.

Said modified zeolite beta as one of the essential components of the hydrocarbon conversion catalyst of the present invention is illuminated firstly as follows.

When the anhydrous chemical formula of the zeolite beta modified with phosphorus and the transition metal M is represented in the mass percent of the oxides, the preferred range is: (0-0.2)Na$_2$O.(1-9)Al$_2$O$_3$.(1.5-7)P$_2$O$_5$.(0.9-10)M$_x$O$_y$.(75-95)SiO$_2$, more preferably (0-0.2)Na$_2$O.(1-9)Al$_2$O$_3$.(2-5)P$_2$O$_5$.(1-3)M$_x$O$_y$.(82-95)SiO$_2$.

In a preferred embodiment, said transition metal M is one or more selected from the group consisting of Fe, Co, Ni and Cu, more preferably Fe and/or Cu.

In the hydrocarbon-converting catalyst provided in the present invention, said zeolite having a MFI structure represent a silica-rich zeolite having a pentasil structure, and is one or more selected from the group consisting of ZSM-5 zeolites and ZRP zeolites, particularly one or more selected from the group consisting of ZRP zeolites containing rare earth (see CN 1052290A, CN 1058382A and U.S. Pat. No. 5,232,675), ZRP zeolites containing phosphorus (see CN 1194181A, U.S. Pat. No. 5,951,963), ZRP zeolites containing phosphorus and rare earth (see CN 1147420A), ZRP zeolites containing phosphorus and alkaline-earth metal (see CN 1211469A, CN 1211470A and U.S. Pat. No. 6,080,698) and ZRP zeolites containing phosphorus and a transition metal (see CN 1465527A and CN 1611299A).

Said large pore zeolite is those having a porous structure having a ring opening of at least 0.7 nm. Said zeolite is, for example, one or more selected from the group consisting of Y-type zeolite, zeolite L, zeolite beta, zeolite Ω, mordenite and ZSM-18 zeolite, particularly one or more selected from the group consisting of Y-type zeolite, Y-type zeolite containing phosphorus and/or rare earth, ultra stable Y-type zeolite, and ultra stable Y-type zeolite containing phosphorus and/or rare earth.

In addition, said zeolite having a MFI structure and said large pore zeolite may be those commercially available, or may also be prepared by using various processes known in the art, which are not herein described in details.

Said zeolite beta modified with phosphorus and the transition metal M may be prepared by using various processes. For example, phosphorus and said transition metal M may be introduced (1) during the synthesis of the zeolite beta; or (2) by the steps of being exchanged with ammonium, being modified with phosphorus, being modified with said transition metal M, being calcined and the like after the synthesis of the zeolite beta.

For example, said zeolite beta modified with phosphorus and the transition metal M may be prepared according to the following process. That is to say, a sodium-type zeolite beta obtained by a conventional crystallization is exchanged in a weight ratio of the zeolite beta:ammonium salt: $H_2O$=1:(0.1-1):(5-10) at a temperature from room temperature to 100° C. for 0.5-2 hour, and filtered. Such an exchanging step is conducted for 1-4 times, so as to make the content of $Na_2O$ in the zeolite beta less than 0.2 wt %. Then, by impregnating or ion-exchanging, phosphorus and one or more transition metals selected from the group consisting of Fe, Co, Ni, Cu, Mn, Zn and Sn are introduced into said exchanged zeolite beta to modify the zeolite beta, then dried, and calcined at 400-800° C. for 0.5-8 hours, wherein said calcination may be conducted at a steam atmosphere, so as to obtain the zeolite beta modified with phosphorus and the transition metal M.

In the process for preparing the modified zeolite beta of the present invention, the modifying process by introducing phosphorus and the transition metal M into said zeolite can be carried out, for example, through an impregnation or ion-exchange method which is conventional in this art.

The impregnation can be effected, for instance, through one of the three ways:

a. An ammonium-exchanged zeolite beta filter cake is uniformly mixed with a predetermined amount of an aqueous solution of a phosphorus compound at a temperature from room temperature to 95° C., then dried, and calcined at 400-800° C., the resultant solid is uniformly mixed with a predetermined amount of an aqueous solution of a compound containing one or more transition metals M selected from Fe, Co, Ni, Cu, Mn, Zn and Sn at a temperature from room temperature to 95° C., then dried;

b. An ammonium-exchanged zeolite beta filter cake is uniformly mixed with a predetermined amount of an aqueous solution of a phosphorus compound at a temperature from room temperature to 95° C., then dried, the resultant solid is uniformly mixed with a predetermined amount of an aqueous solution of a compound containing one or more transition metals M selected from Fe, Co, Ni, Cu, Mn, Zn and Sn at a temperature from room temperature to 95° C., then dried, wherein the impregnation sequence of aforementioned two aqueous solutions can be also reversed; and c. An ammonium-exchanged zeolite beta filter cake is uniformly mixed with a predetermined amount of a mixed aqueous solution containing a phosphorus compound and a compound containing one or more transition metals M selected from Fe, Co, Ni, Cu, Mn, Zn and Sn at a temperature from room temperature to 95° C., then dried.

Said ion exchange may be given for instance as the following method.

The ammonium-exchanged zeolite beta filter cake is uniformly mixed with a predetermined amount of an aqueous solution of a phosphorus compound at a temperature from room temperature to 95° C., then dried, and calcined at 400-800° C., the resultant solid is uniformly mixed with a predetermined amount of an aqueous solution of a compound containing one or more transition metals M selected from Fe, Co, Ni, Cu, Mn, Zn and Sn in a solid/liquid ratio of 1:(5-20), stirred at 80-95° C. for 2-3 hours, then filtered, the exchange step can be repeated many times, the sample thus obtained after exchanging is washed with water many times, then dried.

In the process for preparing the modified zeolite beta of the present invention, said ammonium salt is an inorganic one commonly used in the ammonium exchange treatment in the art, such as one selected from ammonium chloride, ammonium sulfate and ammonium nitrate, or their mixture.

In the process for preparing the modified zeolite beta of the present invention, said phosphorus compound is one selected from phosphoric acid, diammonium hydrogen phosphate, ammonium dihydrogen phosphate and ammonium phosphate, or their mixture.

In the process for preparing the modified zeolite beta of the present invention, said compound containing one or more transition metals M selected from Fe, Co, Ni, Cu, Mn, Zn and Sn is selected from its corresponding water soluble salts such as their sulfates, nitrates, and chlorides.

In the process for preparing the modified zeolite beta of the present invention, said drying may be conducted by the conventional ways, and the drying temperature may be from room temperature to 350° C., preferably 100-200° C. In addition, said calcining temperature is the conventional one, generally 400-800° C., preferably 450-700° C.

In the preparation of said modified zeolite beta, the starting zeolite beta is not particularly defined. The starting zeolite beta may be those commonly used in the art or commercially available, or may be prepared according to the processes known in the art. In the preferred embodiment, said starting zeolite beta is the sodium-type zeolite beta. If said sodium-type zeolite beta contains an organic template agent, the aforesaid operation should be conducted after removing said organic template agent. Moreover, the sodium content in said sodium-type zeolite beta should satisfy the requirement on the sodium content in the anhydrous chemical formula of the zeolite beta comprising phosphorus and said transition metal M. If the sodium content does not satisfy the requirements, the ammonium-exchanging method may be used to remove sodium in said starting sodium-type zeolite beta. In this respect, said ammonium-exchanging step is not essential in the preparation of said modified zeolite beta.

In the process for preparing said modified zeolite beta of the present invention, the devices and condition-regulating methods used therein are not particularly defined, and they may be conventional devices and condition-controlling methods in the art.

The following illuminates another essential component, the thermotolerant inorganic oxide, in the hydrocarbon conversion catalyst of the present invention.

Said thermotolerant inorganic oxide is not particular defined, but is preferably selected from one or more of thermotolerant inorganic oxides used as matrix and binder component of cracking catalyst, e.g., alumina, silica and amorphous silica-alumina. Said thermotolerant inorganic oxide and the preparation processes thereof are known for those skilled in the art. In addition, said thermotolerant inorganic oxide may be commercially available, or may be prepared from the precursors thereof by the processes known in the art.

Additionally, the precursors of said thermotolerant inorganic oxide may be directly used to replace said thermotolerant inorganic oxide in the preparation of the hydrocarbon conversion catalyst of the present invention. The term "thermotolerant inorganic oxide", thereby, covers a thermotolerant inorganic oxide per se and/or precursors thereof.

The precursors of said thermotolerant inorganic oxide herein represent the substances capable of forming said thermotolerant inorganic oxide in the preparation of the hydrocarbon conversion catalyst of the present invention. Specifically for example, the precursor of said alumina may be selected from the group consisting of hydrated alumina and/or alumina sol, wherein said hydrated alumina may, for example, be one or more selected from the group consisting of boehmite, pseudoboehmite, aluminum trihydrate and amorphous aluminum hydroxide. The precursors of said silica may, for example, be one or more selected from the group consisting of silica sol, silica gel and water glass. Furthermore, the precursors of said amorphous silica-alumina may be one or more selected from the group consisting of silica-alumina sol, mixture of silica sol and alumina sol, and silica-alumina gel. In addition, the precursors of said thermotolerant inorganic oxide and the preparation processes thereof are also known for those skilled in the art.

The hydrocarbon conversion catalyst of the present invention may comprise clay as an optional component. Said clay is not particularly defined, but is preferably one or more selected from the group consisting of clays usually as the active components of the cracking catalyst. For example, the clay is one or more selected from the group consisting of kaolin, halloysite, montmorillonite, diatomite, endellite, saponite, rectorite, sepiolite, attapulgite, hydrotalcite and bentonite, preferably one or more selected from the group consisting of kaolin, halloysite and montmorillonite. Said clays and preparation processes thereof are common known for those skilled in the art, or commercially available.

The following processes are illustrated as the process for the preparation of the hydrocarbon conversion catalyst of the present invention, but the present invention is not limited within the scope of said processes.

All or a part of said thermotolerant inorganic oxide and/or precursor thereof are/is mixed with water, and slurried. To the resulting slurry is optionally added said clay. At this time, the residue of said thermotolerant inorganic oxide and/or precursor thereof may be further added therein. Said zeolite mixture is added to the slurry, mixed, uniformly slurried, dried and calcined. Before the addition of said zeolite mixture, before or after the addition of said clay, an acid is added to the resulting slurry so as to adjust the pH of the slurry to 1-5. After the pH falls within the prescribed range, the resulting slurry is aged at 30-90° C. for 0.1-10 hours. After the aging step, the residue of said thermotolerant inorganic oxide and/or precursor thereof is/are added therein.

In the process for the preparation of the hydrocarbon conversion catalyst of the present invention, said clay may be added before or after said aging step. The sequence of adding said clay has no effect on the properties of the hydrocarbon conversion catalyst of the present invention.

In the preparation of the hydrocarbon conversion catalyst of the present invention, All or a part of said thermotolerant inorganic oxide and/or precursor thereof may be added before said aging step. In order to provide said catalyst with better attrition resistance ability, a part of said thermotolerant inorganic oxide and/or precursor thereof is/are added preferably before said aging step, and then the residue of said thermotolerant inorganic oxide and/or precursor thereof is/are added after said aging step. In the latter case, the weight ratio of the part added firstly to the part added later is 1:0.1-10, more preferably 1:0.1-5.

In the process for preparing the hydrocarbon conversion catalyst of the present invention, an acid is added in order to adjust the pH of the slurry. Said acid is one or more selected from the group consisting of water-soluble inorganic acids and organic acids, preferably one or more selected from the group consisting of hydrochloric acid, nitric acid, phosphoric acid and carboxylic acid having 1-10 carbon atoms, in an amount sufficient to adjust the pH of the slurry to 1-5, preferably 1.5-4.

In the process for preparing the hydrocarbon conversion catalyst of the present invention, said aging is conducted at 40-80° C. for 0.5-8 hours.

The methods for drying said slurry and conditions are known for those skilled in the art. For example, said drying may be selected from the group consisting of air drying, baking, forced air drying and spray drying, preferably spray drying. The drying temperature may be from room temperature to 400° C., preferably 100-350° C. In order to be convenient for the spray drying, the solid content of the slurry before drying is preferably 10-50 wt %, more preferably 20-50 wt %.

After drying the slurry, the calcination conditions are also known for those skilled in the art. Generally, the calcination is conducted at 400-700° C., preferably 450-650° C. for at least 0.5 hour, preferably 0.5-100 hours, more preferably 0.5-10 hours.

After the hydrocarbon-converting catalyst of this invention is prepared, it can be used for the catalytic conversion of hydrocarbons of this invention.

In the catalytic conversion of hydrocarbons of this invention, the operation conditions during the catalytic cracking reaction in the reactor are as follows: a reaction temperature of 480-650° C., preferably 500-620° C., an absolute pressure of 0.15-0.30 MPa in the reaction zone, preferably 0.2-0.3 MPa. The hydrocarbon feedstock has a weight hourly space velocity of 0.2-40 h$^{-1}$, preferably 3-30 h$^{-1}$.

In the catalytic conversion of hydrocarbons of this invention, a diluent may be added into the reactor during the catalytic cracking reaction to reduce the partial pressure of the hydrocarbon feedstock, wherein the diluent is one or more selected from the group consisting of water vapor, light alkanes, and nitrogen gas, or the like, wherein the water vapor is preferred and the weight ratio of the water vapor to the hydrocarbon feedstock is preferably 0.01-2:1.

In an alternative embodiment of the catalytic conversion of hydrocarbon of this invention, the reaction product and the spent catalyst (the used catalyst from the hydrocarbon conversion) are took together from said reactor for separation, the separated spent catalyst is stripped, and regenerated by air burning, then returned into the reactor for recycle, the separated reaction product is fractionated to give light olefins, gasoline, diesel, heavy oil and other saturated hydrocarbons with low molecular weight.

In the catalytic conversion of hydrocarbons of this invention, said reaction product and the spent catalyst are took together from said reactor followed by separating via a separator (such as a cyclone separator). The separated catalyst is again passed through a stripping section, and the hydrocarbon product adsorbed on the catalyst is stripped by water vapor or other gases. In an alternative embodiment, the stripped catalyst is sent to a regenerator by a fluidization technique to contact with the oxygen-containing gas at a temperature of, for example, 650-720° C. Then the coke deposited on the catalyst is oxidized and burned, thus regenerating the catalyst. Then the regenerated catalyst is returned to the reactor to be recycled. After the separated reaction product (optionally comprising the hydrocarbon product obtained in the stripping section) is fractionated by a conventional method, the gas (comprising dry gas and liquefied gas), gasoline, diesel, heavy oil and other saturated hydrocarbons with low molecular weight are obtained. Said light olefins comprising ethylene, propylene, and butylene and other components can be separated from said gas by a known separation technique in this art.

The process for the catalytic conversion of hydrocarbons of this invention has the following advantages: by means of using the specific modified zeolite beta and the zeolite having a MFI structure as essential active components of the hydrocarbon conversion catalyst, it exhibits higher ability to convert the petroleum hydrocarbon, and a higher yield for light olefins, particularly for propylene.

EXAMPLES

The following examples are used to illustrate further the present invention, without limiting the present invention.

Examples 1-10 are used to illuminate the zeolite beta modified with phosphorus and the transition metal M, and the preparation process thereof. Contents of $Na_2O$, $Fe_2O_3$, $CO_2O_3$, NiO, CuO, $Mn_2O_3$, ZnO, $SnO_2$, $Al_2O_3$ and $SiO_2$ in each sample of the modified zeolites beta are measured by X-ray fluorescence method (See also Analytical Methods in Petrochemical Industry (RIPP Experiment Techniques), Ed. by Yang Cuiding et. al., Science Press, 1990).

All reagents used as the following are chemical pure reagents; otherwise a special explanation is given.

Example 1

100 g (on dry basis) of the zeolite beta (produced by Qilu Catalyst Company, ratio of $SiO_2/Al_2O_3=25$) was exchanged and washed with a $NH_4Cl$ solution to a $Na_2O$ content of less than 0.2 wt %, filtering, to obtain a filter cake, 6.8 g $H_3PO_4$ (concentration of 85%) and 3.2 g $Cu(NO_3)_2 \cdot 3H_2O$ were added to and dissolved in 90 g water, then mixed with the filter cake to effect impregnation, dried, calcined at 550° C. for 2 hours, then the modified zeolite beta B1 containing phosphorus and the transition metal Cu was obtained. Its anhydrous chemical composition was:

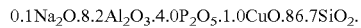

$0.1Na_2O \cdot 8.2Al_2O_3 \cdot 4.0P_2O_5 \cdot 1.0CuO \cdot 86.7SiO_2$.

Example 2

100 g (on dry basis) of the zeolite beta was exchanged and washed with a $NH_4Cl$ solution to a $Na_2O$ content of less than 0.2 wt %, filtering, to obtain a filter cake, 12.5 g $H_3PO_4$ (concentration of 85%) and 6.3 g $CuCl_2$ were added to and dissolved in 90 g water, then mixed with the filter cake to effect impregnation, dried, calcined at 550° C. for 2 hours, then the modified zeolite beta B2 containing phosphorus and the transition metal Cu was obtained. Its anhydrous chemical composition was:

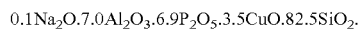

$0.1Na_2O \cdot 7.0Al_2O_3 \cdot 6.9P_2O_5 \cdot 3.5CuO \cdot 82.5SiO_2$.

Example 3

100 g (on dry basis) of the zeolite beta was exchanged and washed with a $NH_4Cl$ solution to a $Na_2O$ content of less than 0.2 wt %, filtering, to obtain a filter cake; 4.2 g $NH_4H_2PO_4$ was dissolved in 60 g water, then mixed with the filter cake to effect impregnation, dried, calcined at 550° C. for 2 hours; aforementioned sample was exchanged with a Cu $(NO_3)_2$ solution (concentration of 5%) in a solid:liquid ratio of 1:5 at 80-90° C. for 2 hours, filtered, the exchange was conducted for several times till a predetermined amount was reached, then calcined at 550° C. for 2 hours, then the modified zeolite beta B3 containing phosphorus and the transition metal Cu was obtained. Its anhydrous chemical composition was:

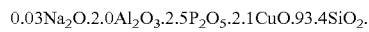

$0.03Na_2O \cdot 2.0Al_2O_3 \cdot 2.5P_2O_5 \cdot 2.1CuO \cdot 93.4SiO_2$.

Example 4

100 g (on dry basis) of the zeolite beta was exchanged and washed with a $NH_4Cl$ solution to a $Na_2O$ content of less than 0.2 wt %, filtering, to obtain a filter cake, 7.1 g $H_3PO_4$ (concentration of 85%) and 8.1 g $Fe(NO_3)_3 \cdot 9H_2O$ were added to and dissolved in 90 g water, then mixed with the filter cake to effect impregnation, then dried; the obtained sample was calcined at 55° C. for 2 hours, then the modified zeolite beta B4 containing phosphorus and the transition metal Fe was obtained. Its anhydrous chemical composition was:

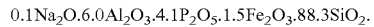

$0.1Na_2O \cdot 6.0Al_2O_3 \cdot 4.1P_2O_5 \cdot 1.5Fe_2O_3 \cdot 88.3SiO_2$.

Example 5

100 g (on dry basis) of the zeolite beta was exchanged and washed with a $NH_4Cl$ solution to a $Na_2O$ content of less than 0.2 wt %, filtering, to obtain a filter cake, 10.3 g $H_3PO_4$ (concentration of 85%) and 39.6 g $Co(NO_3)_2 \cdot 6H_2O$ were added to and dissolved in 90 g water, then mixed with the filter cake to effect impregnation, then dried, calcined at 550° C. for 2 hours, then the modified zeolite beta B5 containing phosphorus and the transition metal Co was obtained. Its anhydrous chemical composition was:

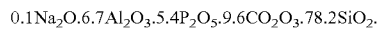

$0.1Na_2O \cdot 6.7Al_2O_3 \cdot 5.4P_2O_5 \cdot 9.6CO_2O_3 \cdot 78.2SiO_2$.

Example 6

100 g (on dry basis) of the zeolite beta was exchanged and washed with a $NH_4Cl$ solution to a $Na_2O$ content of less than 0.2 wt %, filtering, to obtain a filter cake, 7.5 g $H_3PO_4$ (concentration of 85%) and 6.7 g $Ni(NO_3)_2 \cdot 6H_2O$ were added to and dissolved in 90 g water, then mixed with the filter cake to effect impregnation, then dried; the obtained sample was calcined at 550° C. for 2 hours, then the modified zeolite beta B6 containing phosphorus and the transition metal Ni was obtained. Its anhydrous chemical composition was:

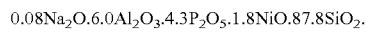

$0.08Na_2O \cdot 6.0Al_2O_3 \cdot 4.3P_2O_5 \cdot 1.8NiO \cdot 87.8SiO_2$.

Example 7

100 g (on dry basis) of the zeolite beta was exchanged and washed with a $NH_4Cl$ solution to a $Na_2O$ content of less than 0.2 wt %, filtering, to obtain a filter cake, 6.9 g $H_3PO_4$ (concentration of 85%) and 16.1 g $Mn(NO_3)_2$ were added to and dissolved in 90 g water, then mixed with the filter cake to effect impregnation, then dried; the obtained sample was calcined at 550° C. for 2 hours, then the modified zeolite beta B7 containing phosphorus and the transition metal Mn was obtained. Its anhydrous chemical composition was:

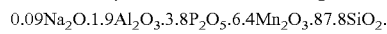

$0.09Na_2O \cdot 1.9Al_2O_3 \cdot 3.8P_2O_5 \cdot 6.4Mn_2O_3 \cdot 87.8SiO_2$.

Example 8

100 g (on dry basis) of the zeolite beta, as a crystallized product, was exchanged and washed with a $NH_4Cl$ solution to a Na$_2$O content of less than 0.2 wt %, filtering, to obtain a filter cake, 2.5 g H$_3$PO$_4$ (concentration of 85%) and 6.1 g Zn(NO$_3$)$_2$.6H$_2$O were added to and dissolved in 90 g water, then mixed with the filter cake to effect impregnation, then dried; the obtained sample was calcined at 550° C. for 2 hours, then the modified zeolite beta B8 containing phosphorus and the transition metal Zn was obtained. Its anhydrous chemical composition was:

0.15Na$_2$O.1.3Al$_2$O$_3$.1.5P$_2$O$_5$.1.6ZnO.95.8SiO$_2$.

Example 9

100 g (on dry basis) of the zeolite beta was exchanged and washed with a NH$_4$Cl solution to a Na$_2$O content of less than 0.2 wt %, filtering, to obtain a filter cake, 7.1 g H$_3$PO$_4$ (concentration of 85%) and 4.2 g SnCl$_4$.5H$_2$O were added to and dissolved in 90 g water, then mixed with the filter cake to effect impregnation, then dried; the obtained sample was calcined at 550° C. for 2 hours, then the modified zeolite beta B9 containing phosphorus and the transition metal Sn was obtained. Its anhydrous chemical composition was:

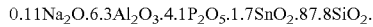

0.11Na$_2$O.6.3Al$_2$O$_3$.4.1P$_2$O$_5$.1.7SnO$_2$.87.8SiO$_2$.

Example 10

100 g (on dry basis) of the zeolite beta was exchanged and washed with a NH$_4$Cl solution to a Na$_2$O content of less than 0.2 wt %, filtering, to obtain a filter cake, 7.1 g H$_3$PO$_4$ (concentration of 85%), 3.2 g Cu(NO$_3$)$_2$.3H$_2$O and 5.3 g Fe(NO$_3$)$_3$.9H$_2$O were added to and dissolved in 90 g water, then mixed with the filter cake to effect impregnation, then dried; the obtained sample was calcined at 550° C. for 2 hours, then the modified zeolite beta B10 containing phosphorus and the transition metals Cu and Fe was obtained. Its anhydrous chemical composition was:

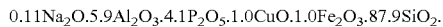

0.11Na$_2$O.5.9Al$_2$O$_3$.4.1P$_2$O$_5$.1.0CuO.1.0Fe$_2$O$_3$.87.9SiO$_2$.

Examples 11-20 are used to illustrate the hydrocarbon conversion catalyst used in the hydrocarbon catalytic conversion process of the present invention, and the preparation process thereof. The starting materials used during the preparation of said catalyst are shown as follows:

Clay:

Halloysite—industrial products by the Suzhou Porcelain Clay Corporation, having a solid content of 71.6%;

Kaolin—industrial products by the Suzhou Kaolin Corporation, having a solid content of 76%;

Montmorillonite—industrial products by the Zhejiang Fenghong Clay Co., Ltd, having a solid content of 95%.

Thermotolerant inorganic oxide or the precursor thereof:

Pseudoboehmite—industrial products by the Shandong Aluminum Factory, having a solid content of 62.0%;

Alumina sol—produced by the Qilu Catalyst Factory, having a Al$_2$O$_3$-content of 21.5%; and Silica sol—produced by the Beijing Chemical Factory, having a silica—content of 16.0%.

All large pore zeolite are produced by the Qilu Catalyst Factory, and the industrial trademarks are as follows:

DASY 2.0 has the physicochemical parameters of unit cell size of 2.446 nm, Na$_2$O content of 1.1%, rare earth oxide RE$_2$O$_3$ content of 2.0%, wherein lanthanum oxide is in an amount of 1.06%; cerium oxide is in an amount of 0.26%; and other rare earth oxides are in an amount of 0.68%;

USY has the physicochemical parameters of unit cell size of 2.445 nm, and Na$_2$O content of 0.36%.

DASY 0.0 has the physicochemical parameters of unit cell size of 2.443 nm, and Na$_2$O content of 0.85%.

DASY 6.0 has the physicochemical parameters of unit cell size of 2.451 nm, Na$_2$O content of 1.6%, rare earth oxide RE$_2$O$_3$ content of 6.2%, wherein lanthanum oxide is in an amount of 3.29%; cerium oxide is in an amount of 0.81%; and other rare earth oxides are in an amount of 2.10%.

REHY has the physicochemical parameters of unit cell size of 2.465 nm, Na$_2$O content of 3.2%, rare earth oxide RE$_2$O$_3$ content of 7.0%, wherein lanthanum oxide is in an amount of 3.71%; cerium oxide is in an amount of 0.91%; and other rare earth oxides are in an amount of 2.38%.

All of the zeolite having a MFI structure are produced by the Qilu Catalyst Factory, and the industrial trademarks are as follows:

ZSP-2, wherein SiO$_2$/Al$_2$O$_3$=70, comprising 0.03% of Na$_2$O, 4.9% of P$_2$O$_5$, and 2.1% of Fe$_2$O$_3$;

ZRP-1, wherein SiO$_2$/Al$_2$O$_3$=30, comprising 0.17% of Na$_2$O, 1.4% of rare earth oxide RE$_2$O$_3$, wherein lanthanum oxide is in an amount of 0.84%; cerium oxide is in an amount of 0.18%; and other rare earth oxides are in an amount of 0.38%;

ZSP-1, wherein SiO$_2$/Al$_2$O$_3$=30, comprising 0.1% of Na$_2$O, 2.0% of P$_2$O$_5$, and 0.9% of Fe$_2$O$_3$; and ZRP-5, wherein SiO$_2$/Al$_2$O$_3$=50, comprising 0.05% of Na$_2$O, and 4.0% of P$_2$O$_5$.

Example 11

6.3 kg of halloysite was added to 25.0 kg of decationized water, and slurried. 4.0 kg of pseudoboehmite was added therein, adjusting the pH thereof to 2 with hydrochloric acid, uniformly stirred and aged by standing at 70° C. for 1 hour. Then, 1.4 kg of alumina sol (the weight ratio of the thermotolerant inorganic oxide (or precursor thereof) added before and after aging is 1:0.12) was added, after uniformly stirred, 7.7 kg of slurry obtained by slurrying a mixture of 0.6 kg (on dry basis) of modified zeolite beta B1, 0.6 kg (on dry basis) of ultra stable zeolite-Y DASY 2.0 and 1.5 kg (on dry basis) of zeolite ZSP-2 having a MFI structure with water was added, and uniformly stirred to yield a slurry with a solid content of 22.5 wt %. The resulting slurry was spray-dried and shaped into particles with diameter of 20-150 µm at 250° C. Then the obtained particles were calcined at 550° C. for 2 hours, to yield catalyst C1. The composition of C1 is shown in Table 1.

Example 12

Catalyst C2 was prepared according to the process in Example 11, except for replacing the zeolite beta B1 with the modified zeolite beta B2 in the same amount. The composition of C2 is shown in Table 1.

Example 13

Catalyst C3 was prepared according to the process in Example 11, except for replacing the zeolite beta B1 with the modified zeolite beta B4 in the same amount. The composition of C3 is shown in Table 1.

Example 14

Catalyst C4 was prepared according to the process in Example 11, except for replacing the zeolite beta B1 with the modified zeolite beta B10 in the same amount. The composition of C4 is shown in Table 1.

Comparative Example 1

This comparative example describes the reference catalysts containing zeolite beta which is not modified with phosphorus and the transition metal, and the preparation process thereof.

Reference catalyst CB1 was prepared according to the process in Example 11, except for replacing the zeolite beta B1 with the zeolite beta (same as Example 1) which is not modified with phosphorus and the transition metal. The composition of CB1 is shown in Table 1.

Comparative Example 2

This comparative example discloses the reference catalysts containing no zeolite beta, and the preparation process thereof.

Reference catalyst CB2 was prepared according to the process in Example 11 except for no zeolite beta was added, and the ultra stable zeolite-Y DASY 2.0 was in an amount of 1.2 kg (on dry basis). The composition of CB2 is shown in Table 1.

TABLE 1

|  | Example No. | | | | | |
| --- | --- | --- | --- | --- | --- | --- |
|  | Ex. 11 | Ex. 12 | Ex. 13 | Ex. 14 | Comp. Ex. 1 | Comp. Ex. 2 |
| Types of the modified zeolite beta | B1 | B2 | B4 | B10 | unmodified | — |
| Modifying elements and contents thereof, wt % | $P_2O_5$, 4.0 CuO, 1.0 | $P_2O_5$, 6.9 CuO, 3.5 | $P_2O_5$, 4.1 $Fe_2O_3$, 1.5 | $P_2O_5$, 4.1 CuO, 1.0 $Fe_2O_3$, 1.0 | — | — |
| Catalyst Composition of the catalyst, wt % | C1 | C2 | C3 | C4 | CB1 | CB2 |
| Halloysite | 45 | 45 | 45 | 45 | 45 | 45 |
| Thermotolerant inorganic oxide | 28 | 28 | 28 | 28 | 28 | 28 |
| DASY 2.0 | 6 | 6 | 6 | 6 | 6 | 12 |
| ZSP-2 | 15 | 15 | 15 | 15 | 15 | 15 |
| Modified zeolite beta | 6 | 6 | 6 | 6 | 6 | — |

Example 15

4.0 kg of pseudoboehmite was added to 12.5 kg of decationized water, adjusting the pH thereof to 2 with nitric acid, uniformly stirred and aged by standing at 50° C. for 5 hours to yield an aged product.

2.3 kg of alumina sol (the weight ratio of the thermotolerant inorganic oxide (or precursor thereof) added before and after aging is 1:0.2) was added to 2.5 kg of decationized water. 4.0 kg of kaolin was added therein, slurried and uniformly stirred. Then, the above aged product and 11.4 kg of slurry obtained by slurrying a mixture of 0.5 kg (on dry basis) of modified zeolite beta B3, 2.5 kg (on dry basis) of ultra stable zeolite-Y USY and 1.0 kg (on dry basis) of the zeolite ZRP-1 having a MFI structure with the decationized water were added, and uniformly stirred to yield a slurry with a solid content of 27.2 wt %. The resulting slurry was spray-dried and shaped into particles with diameter of 20-150 μm at 220° C. Then the obtained particles were calcined at 520° C. for 4 hours, to yield catalyst C5. The composition of C5 is shown in Table 2.

Example 16

3.9 kg of kaolin and 1.1 kg of montmorillonite was added to 18.0 kg of decationized water, and slurried. 4.0 kg of pseudoboehmite (the thermotolerant inorganic oxide precursors were added before aging) was added therein, adjusting the pH thereof to 3 with hydrochloric acid, uniformly stirred and aged by standing at 60° C. for 2 hours. Then, 10.0 kg of slurry obtained by slurrying a mixture of 2.0 kg (on dry basis) of modified zeolite beta B5 containing phosphorus and the transition metal Co, 0.5 kg (on dry basis) of zeolite-Y REHY and 1.0 kg (on dry basis) of the zeolite ZRP-1 having a MFI structure with water was added, and uniformly stirred to yield a slurry with a solid content of 27.0 wt %. The resulting slurry was spray-dried and shaped into particles with diameter of 20-150 μm at 280° C. Then the obtained particles were calcined at 580° C. for 2.5 hours, to yield catalyst C6. The composition of C6 is shown in Table 2.

Example 17

4.2 kg of halloysite was added to 17.8 kg of decationized water, and slurried. 4.0 kg of pseudoboehmite was added therein, adjusting the pH thereof to 3.5 with hydrochloric acid, uniformly stirred and aged by standing at 75° C. for 0.5 hour. 2.3 kg of alumina sol (the weight ratio of the thermotolerant inorganic oxide (or precursor thereof) added before and after aging is 1:0.2) was added therein, uniformly stirred. Then 11.4 kg of slurry obtained by slurrying a mixture of 1.0 kg (on dry basis) of modified zeolite beta B6 containing phosphorus and the transition metal Ni, 1.0 kg (on dry basis) of ultra stable zeolite-Y DASY 0.0 and 2.0 kg (on dry basis) of the zeolite ZSP-1 having a MFI structure with water was added, and uniformly stirred to yield a slurry with a solid content of 25.2 wt %. The resulting slurry was spray-dried and shaped into particles with diameter of 20-150 μm at 250° C. Then the obtained particles were calcined at 600° C. for 1 hour, to yield catalyst C7. The composition of C7 is shown in Table 2.

Example 18

4.9 kg of halloysite was added to 20.0 kg of decationized water, and slurried. 4.0 kg of pseudoboehmite was added therein, adjusting the pH thereof to 3.5 with hydrochloric acid, uniformly stirred and aged by standing at 75° C. for 0.5 hour. 2.3 kg of alumina sol (the weight ratio of the thermotolerant inorganic oxide (or precursor thereof) added before and after aging is 1:0.2) was added therein, uniformly stirred. Then, 10.0 kg of slurry obtained by slurrying a mixture of 0.2 kg (on dry basis) of modified zeolite beta B7 containing phosphorus and the transition metal Mn, 0.8 kg (on dry basis) of ultra stable zeolite-Y DASY 2.0 and 2.5 kg (on dry basis) of the zeolite ZSP-1 having a MFI structure with water was added, and uniformly stirred to yield a slurry with a solid content of 24.3 wt %. The resulting slurry was spray-dried and shaped into particles with diameter of 20-150 μm at 250° C. Then the obtained particles were calcined at 600° C. for 1 hour, to yield catalyst C8. The composition of C8 is shown in Table 2.

Example 19

3.5 kg of halloysite was added to 15.6 kg of decationized water, and slurried. 4.0 kg of pseudoboehmite was added therein, adjusting the pH thereof to 4 with hydrochloric acid, uniformly stirred and aged by standing at 60° C. for 1 hour. 4.7 kg of alumina sol (the weight ratio of the thermotolerant inorganic oxide (or precursor thereof) added before and after aging is 1:0.4) was added therein, uniformly stirred. Then, 11.4 kg of slurry obtained by slurrying a mixture of 0.5 kg (on dry basis) of modified zeolite beta B8, 0.5 kg (on dry basis) of ultra stable zeolite-Y DASY 6.0 and 3.0 kg (on dry basis) of the zeolite ZRP-5 having a MFI structure with water was added, and uniformly stirred to yield a slurry with a solid content of 25.5 wt %. The resulting slurry was spray-dried and shaped into particles with diameter of 20-150 μm at 220° C. Then the obtained particles were calcined at 550° C. for 2 hours, to yield catalyst C9. The composition of C9 is shown in Table 2.

Example 20

3.2 kg of halloysite was added to 12.0 kg of decationized water to be slurried. The pH of the slurry was adjusted to 3 with hydrochloric acid, uniformly stirred and aged by standing at 55° C. for 6 hours. 21.9 kg of silica sol and 2.3 kg of alumina sol (the weight ratio of the thermotolerant inorganic oxide (or precursor thereof) added before and after aging is 1:2) were added therein, and uniformly stirred. Then, 11.4 kg of slurry obtained by slurrying a mixture of 1.0 kg of (on dry basis) of modified zeolite beta B9, 3.0 kg of (on dry basis) of the zeolite ZRP-5 having a MFI structure with water was added, and uniformly stirred to yield a slurry with a solid content of 19.7 wt %. The resulting slurry was spray-dried and shaped into particles with diameter of 20-150 μm at 250° C. Then the obtained particles were calcined at 550° C. for 2 hours, to yield catalyst C10. The composition of C10 is shown in Table 2.

TABLE 2

| | Example No. | | | | | |
|---|---|---|---|---|---|---|
| | Ex. 15 | Ex. 16 | Ex. 17 | Ex. 18 | Ex. 19 | Ex. 20 |
| Catalyst | C5 | C6 | C7 | C8 | C9 | C10 |
| Clay: | | | | | | |
| Type | kaolin | kaolin + montmorillonite | halloysite | halloysite | halloysite | — |
| Content, wt % | 30 | 40 | 30 | 35 | 25 | — |
| Thermotolerant inorganic oxide: | | | | | | |
| Type | alumina | alumina | alumina | alumina | alumina | alumina + silica |
| Content, wt % | 30 | 25 | 30 | 30 | 35 | 60 |
| Large pore zeolite: | | | | | | |
| Type | USY | REHY | DASY 0.0 | DASY 2.0 | DASY 6.0 | — |
| Content, wt % | 25 | 5 | 10 | 8 | 5 | — |
| Zeolite having a MFI structure: | | | | | | |
| Type | ZRP-1 | ZRP-1 | ZSP-1 | ZSP-1 | ZRP-5 | ZRP-5 |
| Content, wt % | 10 | 10 | 20 | 25 | 30 | 30 |
| Zeolite beta: | | | | | | |
| Type | B3 | B5 | B6 | B7 | B8 | B9 |
| Content, wt % | 5 | 20 | 10 | 2 | 5 | 10 |
| Types of modifying elements and contents thereof, wt % | $P_2O_5$, 2.5 CuO, 2.1 | $P_2O_5$, 5.4 $Co_2O_3$, 9.6 | $P_2O_5$, 4.3 NiO, 1.8 | $P_2O_5$, 3.8 $Mn_2O_3$, 6.4 | $P_2O_5$, 1.5 ZnO, 1.6 | $P_2O_5$, 4.1 $SnO_2$, 1.7 |

Examples 21-24

Examples 21-24 are used to illuminate the catalytic conversion effects by hydrocarbon-converting catalyst provided in the present invention.

Catalysts of C1-C4 were aged with 100% steam at 800° C. for 14 hours. A small sized fixed fluidized bed reactor was used, and 180 g of the catalyst was fed into the reactor. The aged catalysts were respectively evaluated by introducing the mixture of vacuum gas oil and steam (wherein the amount of steam was 25% by weight of the vacuum gas oil) under the conditions of a reaction temperature of 560° C., a catalyst to oil ratio of 10 and a weight hourly space velocity of 4 $h^{-1}$. The properties of the vacuum gas oil are shown in Table 3, the evaluation results are shown in Table 4.

Comparative Examples 3-4

Comparative Examples 3-4 are used to illustrate the catalytic conversion effects on hydrocarbons of the reference catalysts.

The effects of the reference catalysts CB1 and CB2 are evaluated using the same feed oil according to the process in Example 21, and the results are shown in Table 4.

TABLE 3

| Feed oil | Vacuum gas oil | Atmospheric residue |
|---|---|---|
| Density (20° C.), g/cm$^3$ | 0.8764 | 0.8906 |
| Viscosity (80° C.), mm$^2$/s | 12.06 | 24.84 |
| Asphaltene, wt % | — | 0.8 |
| Conradson carbon residue, wt % | 0.93 | 4.3 |
| Distillation range, ° C. | | |
| IBP | 246 | 282 |
| 10 vol % | 430 | 370 |
| 30 vol % | 482 | 482 |
| 50 vol % | 519 | 553 |
| 70 vol % | 573(75.2 vol %) | — |
| 90 vol % | — | — |
| FBP | — | — |

TABLE 4

| | Ex. 21 | Ex. 22 | Ex. 23 | Ex. 24 | Comp. Ex. 3 | Comp. Ex. 4 |
|---|---|---|---|---|---|---|
| Catalyst | C1 | C2 | C3 | C4 | CB1 | CB2 |
| Conversion | 90.2 | 90.0 | 90.4 | 90.7 | 88.7 | 88.1 |
| Product distribution, wt % | | | | | | |
| Dry gas | 10.0 | 10.5 | 10.1 | 10.1 | 9.1 | 8.6 |
| LPG | 45.4 | 44.6 | 45.8 | 46.1 | 44.0 | 43.6 |
| Gasoline | 22.4 | 22.3 | 22.2 | 21.7 | 23.9 | 24.7 |
| Diesel | 5.5 | 5.6 | 5.4 | 5.3 | 5.9 | 6.2 |
| Heavy oil | 4.3 | 4.4 | 4.2 | 4.0 | 5.4 | 5.7 |
| Coke | 12.4 | 12.6 | 12.3 | 12.8 | 11.7 | 11.2 |
| wherein Ethylene | 5.2 | 5.3 | 5.5 | 5.4 | 5.1 | 4.7 |
| Propylene | 18.5 | 18.3 | 18.8 | 19.1 | 18.0 | 17.9 |
| Butylene | 12.8 | 12.7 | 12.9 | 12.8 | 12.2 | 11.9 |

The results in Table 4 showed that, as compared with the process for the catalytic conversion of hydrocarbons using reference catalyst CB1 aged at the same conditions and having the same zeolite content in which the zeolite beta was not modified, the hydrocarbon catalytic conversion of the present invention increased the capability for cracking heavy oils by 1.3-2%; the LPG yield by 0.6-2.1%; the light olefins ($C_2^=$ + $C_3^=$ + $C_4^=$) yield by 1-2%; as compared with the reference catalyst CB2 containing no zeolite beta, the hydrocarbon catalytic conversion of the present invention increased the capability for cracking heavy oils by 1.9-2.6%; the LPG yield by 1.0-2.5%; the light olefins ($C_2^=$ + $C_3^=$ + $C_4^=$) yield by 1.8-2.8%.

Examples 25-30

Examples 25-30 are used to illustrate the reaction results under different reaction conditions.

Catalysts of C5-C10 were aged with 100% steam at 800° C. for 17 hours. A small sized fixed fluidized bed reactor was used, and 180 g of the catalyst was fed into the reactor. The aged catalysts were respectively evaluated by introducing the atmospheric residue. The properties of the atmospheric residue are shown in Table 3, and the reaction conditions and product distribution is shown in Table 5.

TABLE 5

| | Ex. 25 | Ex. 26 | Ex. 27 | Ex. 28 | Ex. 29 | Ex. 30 |
|---|---|---|---|---|---|---|
| Catalyst | C5 | C6 | C7 | C8 | C9 | C10 |
| Reaction temperature, ° C. | 520 | 520 | 580 | 580 | 620 | 620 |
| Catalyst/oil weight ratio | 10 | 10 | 10 | 10 | 10 | 10 |
| Weight hourly space velocity, h$^{-1}$ | 10 | 10 | 15 | 15 | 20 | 20 |
| Weight percent of steam in the atmospheric residue, wt % | 12.5 | 12.5 | 25 | 25 | 37.5 | 37.5 |
| Conversion | 79.5 | 78.9 | 85.6 | 83.4 | 86.5 | 86.6 |
| Product distribution, % | | | | | | |
| Dry gas | 5.6 | 5.5 | 10.3 | 9.8 | 12.7 | 12.6 |
| LPG | 21.9 | 21.8 | 39.8 | 40.7 | 43.2 | 42.5 |
| Gasoline | 43.4 | 43.1 | 23.3 | 22.4 | 18.3 | 18.1 |
| Diesel | 14.0 | 14.1 | 9.9 | 10.3 | 8.6 | 8.6 |
| Heavy oil | 6.5 | 7.0 | 4.5 | 6.3 | 4.9 | 4.8 |
| Coke | 8.6 | 8.5 | 12.2 | 10.5 | 12.3 | 13.4 |

TABLE 5-continued

| | | Ex. 25 | Ex. 26 | Ex. 27 | Ex. 28 | Ex. 29 | Ex. 30 |
|---|---|---|---|---|---|---|---|
| wherein | Ethylene | 1.5 | 1.4 | 5.2 | 5.1 | 6.8 | 6.8 |
| | Propylene | 6.5 | 6.7 | 13.5 | 16.7 | 21.6 | 21.1 |
| | Butylene | 6.2 | 7.0 | 12.8 | 12.5 | 14.3 | 14.6 |

Examples 31-33

Examples 31-33 are used to illustrate the cracking results of hydrocarbons under different reaction temperatures.

Catalyst C4 was aged with 100% steam at 800° C. for 14 hours. A small sized fixed fluidized bed reactor was used, and 180 g of the catalyst was fed into the reactor. The mixture of vacuum gas oil and steam (wherein the amount of steam was 25% by weight of the vacuum gas oil) as shown in Table 3 is introduced under the conditions of different reaction temperatures, a catalyst to oil ratio of 10 and a weight hourly space velocity of 4 h$^{-1}$, and the results are shown in Table 6.

TABLE 6

| Example No. | | Ex. 31 | Ex. 32 | Ex. 33 |
|---|---|---|---|---|
| Catalyst | | C4 | C4 | C4 |
| Reaction temperature, ° C. | | 520 | 560 | 600 |
| Conversion | | 79.3 | 90.7 | 94.6 |
| Product distribution, % | | | | |
| Dry gas | | 5.2 | 10.1 | 14.3 |
| LPG | | 21.9 | 46.1 | 49.5 |
| Gasoline | | 43.6 | 21.7 | 16.5 |
| Diesel | | 13.6 | 5.3 | 3.4 |
| Heavy oil | | 7.1 | 4.0 | 2.0 |
| Coke | | 8.6 | 12.8 | 14.3 |
| wherein | Ethylene | 1.5 | 5.4 | 7.1 |
| | Propylene | 7.5 | 19.1 | 21.9 |
| | Butylene | 6.2 | 12.8 | 13.5 |

Examples 34-36

Examples 34-36 are used to illustrate the cracking results of hydrocarbons under different weight hourly space velocities.

Catalyst C4 was aged with 100% steam at 800° C. for 14 hours. A small sized fixed fluidized bed reactor was used, and 180 g of the catalyst was fed into the reactor. The mixture of vacuum gas oil and steam (wherein the amount of steam was 25% by weight of the vacuum gas oil) as shown in Table 3 is introduced under the conditions of a reaction temperature of 560° C., a catalyst to oil ratio of 10 and different weight hourly space velocities, and the results are shown in Table 7.

TABLE 7

| Example No. | Ex. 34 | Ex. 35 | Ex. 36 |
|---|---|---|---|
| Catalyst | C4 | C4 | C4 |
| Weight hourly space velocity, hour$^{-1}$ | 4 | 8 | 12 |
| Conversion | 90.7 | 89.9 | 88.9 |
| Product distribution, % | | | |
| Dry gas | 10.1 | 9.5 | 8.9 |
| LPG | 46.1 | 43.5 | 41.4 |
| Gasoline | 21.7 | 24.8 | 27.1 |
| Diesel | 5.3 | 5.6 | 6.2 |
| Heavy oil | 4.0 | 4.5 | 4.9 |
| Coke | 12.8 | 12.1 | 11.5 |

TABLE 7-continued

| Example No. | | Ex. 34 | Ex. 35 | Ex. 36 |
|---|---|---|---|---|
| wherein | Ethylene | 5.4 | 5.1 | 4.7 |
| | Propylene | 19.1 | 18.6 | 18.1 |
| | Butylene | 12.8 | 12.4 | 11.9 |

Examples 37-39

Examples 37-39 are used to illustrate the cracking results of hydrocarbons under different catalyst/oil weight ratios.

Catalyst C4 was aged with 100% steam at 800° C. for 14 hours. A small sized fixed fluidized bed reactor was used, and 180 g of the catalyst was fed into the reactor. The mixture of vacuum gas oil and steam (wherein the amount of steam was 25% by weight of the vacuum gas oil) as shown in Table 3 is introduced under the conditions of a reaction temperature of 560° C., a weight hourly space velocity of 4 h$^{-1}$, and different weight hourly space velocities, and the results are shown in Table 8.

TABLE 8

| Example No. | | Ex. 37 | Ex. 38 | Ex. 39 |
|---|---|---|---|---|
| Catalyst | | C4 | C4 | C4 |
| Catalyst/oil weight ratio | | 10 | 15 | 20 |
| Conversion | | 90.7 | 91.4 | 92.1 |
| Product distribution, % | | | | |
| Dry gas | | 10.1 | 10.6 | 11.1 |
| LPG | | 46.1 | 46.7 | 47.2 |
| Gasoline | | 21.7 | 20.8 | 20.1 |
| Diesel | | 5.3 | 5 | 4.6 |
| Heavy oil | | 4 | 3.6 | 3.3 |
| Coke | | 12.8 | 13.3 | 13.7 |
| wherein | Ethylene | 5.4 | 5.5 | 5.7 |
| | Propylene | 19.1 | 19.3 | 20.1 |
| | Butylene | 12.8 | 13.2 | 13.4 |

The invention claimed is:

1. A process for the catalytic conversion of hydrocarbons, said process comprising the following steps:

a feedstock of hydrocarbons is contacted with a hydrocarbon-converting catalyst to conduct a catalytic cracking reaction in a reactor in which the catalyst is movable, then the reaction product and the spent catalyst are taken from said reactor for separation by stripping, the separated spent catalyst is returned into the reactor for recycle after regenerated by air burning, and the separated reaction product is fractionated to give light olefins, gasoline, diesel, heavy oil and other saturated hydrocarbons with low molecular weight, characterized in that said hydrocarbon-converting catalyst comprises, based on the total weight of the catalyst, 1-60 wt % of a zeolite mixture, 5-99 wt % of a thermotolerant inorganic oxide and 0-70 wt % of clay, wherein said zeolite mixture comprises, based on the total weight of said zeolite mixture, 1-75 wt % of a zeolite beta modified with phosphorus and a transition metal M, 25-99 wt % of a zeolite having a MFI structure and 0-74 wt % of a large pore zeolite, wherein the anhydrous chemical formula of the zeolite beta modified with phosphorus and the transition metal M is represented in the mass percent of the oxides as $(0\text{-}0.3)Na_2O \cdot (0.5\text{-}10)Al_2O_3 \cdot (1.3\text{-}10)P_2O_5 \cdot (0.7\text{-}15)M_xO_y \cdot (64\text{-}97)SiO_2$, in which the transition metal M is Cu; x represents the atom number of the transition metal M, and y represents a number needed for satisfying the oxidation state of the transition metal M.

2. The process according to claim 1, characterized in that the hydrocarbon-converting catalyst comprises, based on the total weight of the catalyst, 10-50 wt % of the zeolite mixture, 10-70 wt % of the thermotolerant inorganic oxide and 0-60 wt % of the clay.

3. The process according to claim 1, characterized in that the anhydrous chemical formula of the zeolite beta modified with phosphorus and the transition metal M is represented as $(0\text{-}0.2)Na_2O \cdot (1\text{-}9)Al_2O_3 \cdot (1.5\text{-}7)P_2O_5 \cdot (0.9\text{-}10)M_xO_y \cdot (75\text{-}95)SiO_2$.

4. The process according to claim 3, characterized in that the anhydrous chemical formula of the zeolite beta modified with phosphorus and the transition metal M is represented as: $(0\text{-}0.2)Na_2O \cdot (1\text{-}9)Al_2O_3 \cdot (2\text{-}5)P_2O_5 \cdot (1\text{-}3)M_xO_y \cdot (82\text{-}95)SiO_2$.

5. The process according to claim 1, characterized in that the zeolite having a MFI structure is one or more selected from the group consisting of ZSM-5 zeolites and ZRP zeolites.

6. The process according to claim 5, characterized in that the zeolite having a MFI structure is one or more selected from the group consisting of ZRP zeolites containing rare earth, ZRP zeolites containing phosphorus, ZRP zeolites containing phosphorus and rare earth, ZRP zeolites containing phosphorus and alkaline-earth metal and ZRP zeolites containing phosphorus and a transition metal.

7. The process according to claim 1, characterized in that the large pore zeolite is one or more selected from the group consisting of faujasite, zeolite L, zeolite beta, zeolite Ω, mordenite and ZSM-18 zeolite.

8. The process according to claim 7, characterized in that the large pore zeolite is one or more selected from the group consisting of Y-type zeolite, Y-type zeolite containing phosphorus and/or rare earth, ultra stable Y-type zeolite, and ultra stable Y-type zeolite containing phosphorus and/or rare earth.

9. The process according to claim 1, characterized in that the clay is one or more selected from the group consisting of kaolin, halloysite, montmorillonite, diatomite, endellite, saponite, rectorite, sepiolite, attapulgite, hydrotalcite and bentonite.

10. The process according to claim 1, characterized in that the clay is one or more selected from the group consisting of kaolin, halloysite and montmorillonite.

11. The process according to claim 1, characterized in that the reactor is one or more selected from the group consisting of a fluidized bed reactor, a riser, a downward conveying line reactor, and a moving bed reactor, or any combination thereof.

12. The process according to claim 11, characterized in that the riser is one or more selected from the group consisting of a riser with equal diameter, a riser with equal linear velocity and a riser with graduated diameter.

13. The process according to claim 11, characterized in that the fluidized bed reactor is one or more selected from the group consisting of a fixed fluidized bed reactor, a particulate fluidized bed reactor, a bubbling bed reactor, a turbulent bed reactor, a fast bed reactor, a conveying bed reactor and a dense phase fluidized bed reactor.

14. The process according to claim 1, characterized in that the operation conditions during the catalytic cracking reaction in the reactor are as follows: the reaction temperature being 480-650° C., the absolute pressure in the reaction zone being 0.15-0.30 MPa, and the weight hourly space velocity of the hydrocarbon feedstocks being 0.2-40 $h^{-1}$.

15. The process according to claim 1, characterized in that the hydrocarbon feedstock is one or more selected from the group consisting of $C_4$ hydrocarbons, gasoline, diesel, hydrogenation residue, vacuum gas oil, crude oil, and residue oil, or a mixture thereof.

16. The process according to claim 1, characterized in that a diluent is added into the reactor during the catalytic cracking reaction to reduce the partial pressure of the hydrocarbon feedstock, wherein the diluent is one or more selected from the group consisting of water vapor, light alkanes, and nitrogen gas, or a mixture thereof.

17. The process according to claim 16, characterized in that the diluent is water vapor, and the weight ratio of water vapor to the hydrocarbon feedstock is 0.01-2:1.

* * * * *